(No Model.)
T. L. CONE.
RIDING HARROW.
No. 289,232. Patented Nov. 27, 1883.
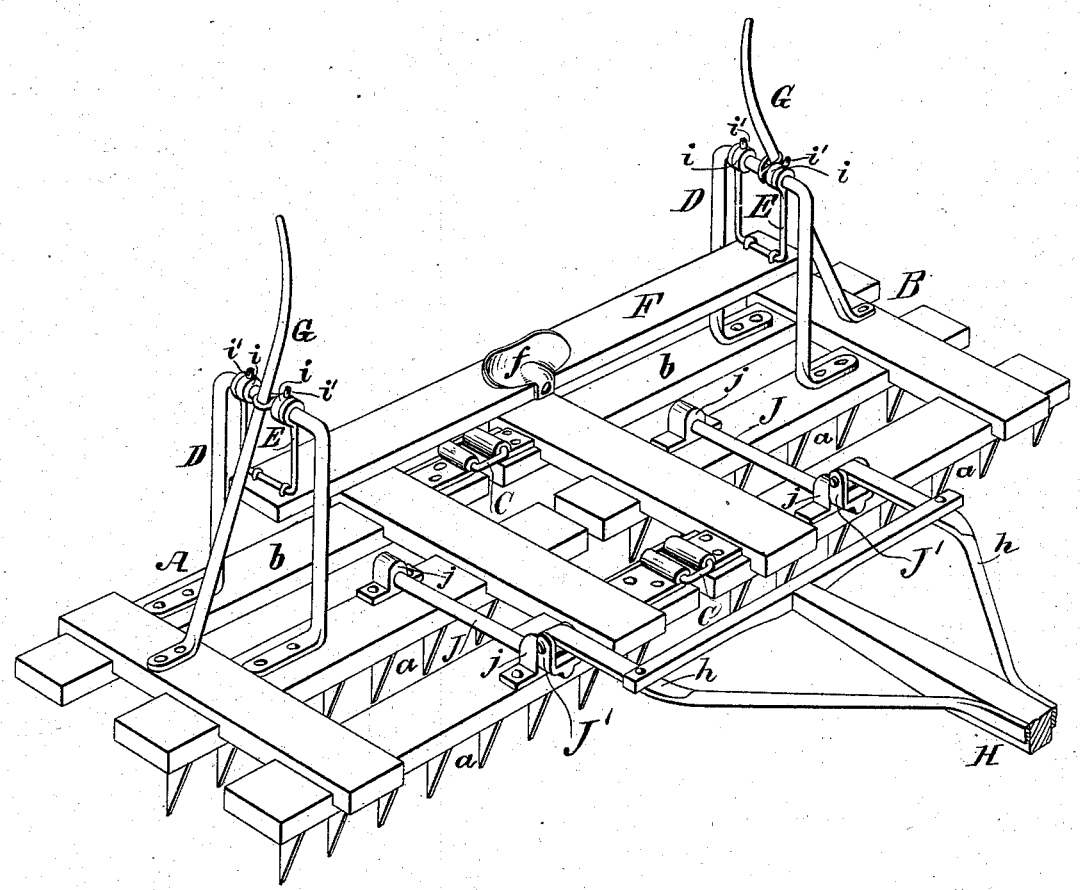
WITNESSES:
INVENTOR:
T. L. Cone
BY Munn & Co
ATTORNEYS.

UNITED STATES PATENT OFFICE.

THOMAS L. CONE, OF BREST, MISSOURI.

RIDING-HARROW.

SPECIFICATION forming part of Letters Patent No. 289,232, dated November 27, 1883.

Application filed April 3, 1883. (No model.)

*To all whom it may concern:*

Be it known that I, THOMAS L. CONE, of Brest, in the county of Jasper and State of Missouri, have invented a new and useful Improvement in Riding-Harrows, of which the following is a full, clear, and exact description.

Reference is to be had to the accompanying drawing, forming part of this specification, in which the figure is a perspective view of my new and improved harrow.

The frame of the harrow is composed of the two sections A B. These are duplicates of each other, and are hinged together by the loop or double hinges C C, which permit an easy and direct up-and-down motion of each section independent of the other, and render the harrow very flexible, so that it may readily adapt itself to any unevenness of the ground without lateral motion, which would allow the teeth *a a* of the sections to dodge hard clods in the ground.

Upon the sections A B are secured the uprights D, to which are suspended by means of the bails E E the ends of the seat-board F, in the center of which is formed or attached the seat *f* for the driver.

G G are levers, by which the driver, when sitting on the seat *f*, may easily raise either end of the harrow for dropping accumulated trash off from the teeth, or for passing over stones, low stumps, or other obstructions. In order that the tongue H shall not interfere with the up-and-down movement of the ends of the harrow, I attach the rods *h h* of the tongue to the sections A B by means of the clevis-rods J J, which are adapted to turn easily in the keepers *j j*, so that all binding of the tongue-connection with the sections A B is avoided. The clevis-heads J' are formed upon or rigidly fixed to the rods J, to turn therewith. The rear beams, *b b*, of the sections A B are not provided with drag-teeth, and they are thus adapted to smooth and level off the ground after the teeth *a* of the other beams have passed over or through it.

The seat-board F may be shifted backward or forward upon the uprights D D, for bringing the weight of the driver properly over the sections A B, to cause them to do effective work; and for holding the seat-board at any desired position I provide the said uprights with the sliding collars *i i*, which have the set-screws *i' i'*, by which the collars may be made fast upon the uprights for keeping the bails E E in the position desired. The uprights D D are attached to the sections A B near their outer ends, so that the weight of the driver will come where the harrow would otherwise do the lightest and poorest work. The double attachment of the seat-board enables me to do this, and this arrangement is of great advantage, since by that means the action of the harrow is made uniform throughout its length, and much more effective in its work than ordinary harrows.

The harrow, as a whole, will be made very light, so that the weight of the rear end of the tongue and the double-tree and single-trees attached thereto will make it a matter of slight exertion to tip the harrow bodily over upon the rear end of the tongue, so that the teeth of the harrow may be cleaned without unhitching the team or removing any of the parts of the harrow. The uprights D D being perpendicular, and the bails E E being free to turn thereon, there will be no chafing or cramping of the parts when the harrow passes over ridges, clods, or other objects that would raise either or both ends of the harrow, to interfere with the weight of the driver in bringing the harrow immediately back to horizontal position.

I do not claim hinged harrow-sections having a tongue swiveled thereto, nor a swinging seat-support, nor means for raising the sections in order to clear the teeth of weeds, &c., since these combinations of parts are old and shown in prior Letters Patent.

What I claim is—

The combination, with the hinged harrow-sections A and B, the rigidly-connected tongue-rods *h h*, swiveled clevis-rods J J, and keepers *j j*, of the uprights D D, rigidly attached to the sections, the seat-board F, swinging hangers E E, and levers G G, all as shown and described, to operate as specified.

THOMAS L. CONE.

Witnesses:
ALBERT F. FRYE,
JULIUS TOWER.